United States Patent [19] [11] 4,406,193
Sugino et al. [45] Sep. 27, 1983

[54] APPARATUS FOR URGING WORKPIECES AGAINST CHUCKS

[75] Inventors: Yoshihide Sugino, Chigasaki; Hiroshi Shoji, Fujisawa, both of Japan

[73] Assignee: Yamatake Honeywell Co., Ltd., Tokyo, Japan

[21] Appl. No.: 292,302

[22] Filed: Aug. 12, 1981

[30] Foreign Application Priority Data

May 15, 1981 [JP] Japan ................................ 56-72924

[51] Int. Cl.³ ........................ B23B 13/00; B23B 15/00

[52] U.S. Cl. ...................................... 82/34 R; 82/2.5; 294/86 R

[58] Field of Search ....................... 82/2.5, 2.7, 45, 31, 82/34 R; 294/86 R, 106; 29/568

[56] References Cited

U.S. PATENT DOCUMENTS

| | | | |
|---|---|---|---|
| 2,341,284 | 2/1944 | Payne | 82/34 R |
| 2,919,615 | 1/1960 | Brown | 82/34 R |
| 3,552,062 | 9/1968 | Brown | 82/2.7 |
| 3,572,520 | 3/1971 | Evans | 82/2.5 |
| 3,826,047 | 7/1974 | Binder | 82/45 |
| 3,963,271 | 6/1976 | Sugino et al. | 294/106 |
| 4,312,618 | 1/1982 | Greene | 82/2.7 |
| 4,317,394 | 3/1982 | Link et al. | 82/2.7 |

*Primary Examiner*—Robert E. Garrett
*Assistant Examiner*—Thomas M. Kline
*Attorney, Agent, or Firm*—Remy J. Van Ophem

[57] ABSTRACT

A workpiece is urged against a chuck by a press plate supported by one end of a piston rod through a ball bearing. A rear end of a cylinder for the piston rod is swingably supported by a ball interposed between the rear surface of the cylinder and a stationary plate. Bolts for securing the cylinder to the stationary plate are formed with tapered portions mating with the tapered openings of bushings fitted to the supporting plate so as to selectively permit swinging motion of the cylinder.

4 Claims, 12 Drawing Figures

APPARATUS FOR URGING WORKPIECES AGAINST CHUCKS

BACKGROUND OF THE INVENTION

This invention relates to apparatus for urging a workpiece against the surface of a chuck of a lathe or the like to securely hold the workpiece at a correct position.

When mounting a workpiece on a chuck of a machine tool with a hand of a robot machine, there are such problems as an inclination of the axis of the workpiece with respect to the axis of the chuck (hereinafter termed a deflection angle) and displacement of the axis of the workpiece from that of the chuck (hereinafter termed an eccentricity). The operation of the chuck for holding the workpiece will now be described with reference to FIGS. 1A through 1D. Referring first to FIG. 1A, when a workpiece 1 is grasped by a hand of a robot machine, for example, and then grasped by a chuck, a deflection angle $\delta$ is often occurs between the workpiece 1 and the chuck 2. In such a case, a press device is operated as shown in FIG. 1B to urge its press plate 3 against the rear surface of the workpiece so as to eliminate the inclination of the workpiece 1 by the force F applied to the press plate. As the chuck 2 clamps further, the eccentricity e present in the state, as shown in FIG. 1B, is eliminated so that the workpiece 1 can be held by the chuck 2 without any deflection angle and eccentricity.

As will be seen from the comparison of FIGS. 1A and 1B, the control of the workpiece effected by the press plate utilizes a slip between the workpiece 1 and the press plate 3, and in the absence of such a slip, the workpiece 1 would be held by the chuck 2 without eliminating the deflection angle as shown in FIG. 1D. FIG. 2 shows the detail between the slip and the dimension of the workpiece 1. It will be appreciated from the figure that where the length L of the workpiece 1 is larger than a predetermined value, a slip represented by $L\cdot\Delta\theta$ appears whereas no slip occurs unless the friction coefficient between the workpiece and the press plate 3 in less than l/L. These facts were confirmed by our experiment.

As described above, in certain cases, depending upon the dimension of the workpiece, it is impossible to eliminate the deflection angle by the slippage between the workpiece and the pressing plate. Accordingly, it has been desired to develop an improved apparatus capable of urging the workpiece without resorting to slippage.

SUMMARY OF THE INVENTION

Accordingly, it is an object of this invention to provide an improved apparatus for urging a workpiece against a chuck without deflection or eccentricity between the axes of the workpiece and the chuck irrespective of the dimension of the workpiece, thereby improving the chucking accuracy of the workpiece.

According to this invention, there is provided apparatus for urging a workpiece against a chuck including a stationary bracket having a holding plate facing the chuck and provided with tapered openings, a plurality of holding rods extending through the tapered openings, the holding rods being provided with tapered portions and diameters thereof increasing with distances to the chuck, a fluid pressure cylinder supported by the supporting rods and having a piston rod, a workpiece press member pivotally mounted on an operating end of the piston rod, spring members interposed between the fluid pressure cylinder and the bracket for separating the fluid pressure cylinder away from the bracket, and a ball interposed between the holding plate and the rear end of the fluid pressure cylinder at the center of the plurality of the holding rods for permitting swinging motion of the fluid pressure cylinder when the workpiece is urged by the press member against the chuck surface.

DESCRIPTION OF THE PREFERRED EMBODIMENT

Figure 1A:
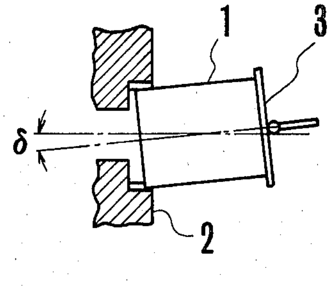
FIG. 1A PRIOR ART
FIGS. 1A through 1D are partial schematic views showing the prior art manner of mounting a workpiece on a chuck.
Figure 1B:
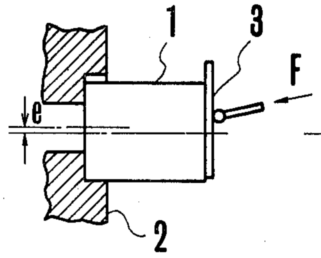
FIG. 1B PRIOR ART
Figure 1C:
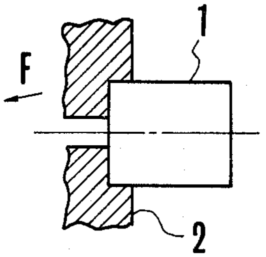
FIG. 1C PRIOR ART
Figure 1D:
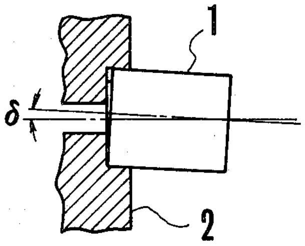
FIG. 1D PRIOR ART
Figure 2:
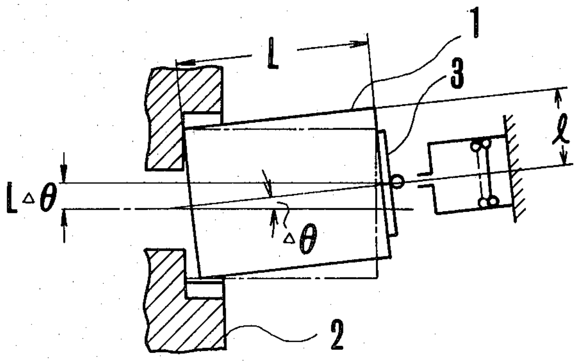
FIG. 2 is a schematic view showing the relationship between the slip of a workpiece relative to a press plate and the dimension of the workpiece.
Figure 3:
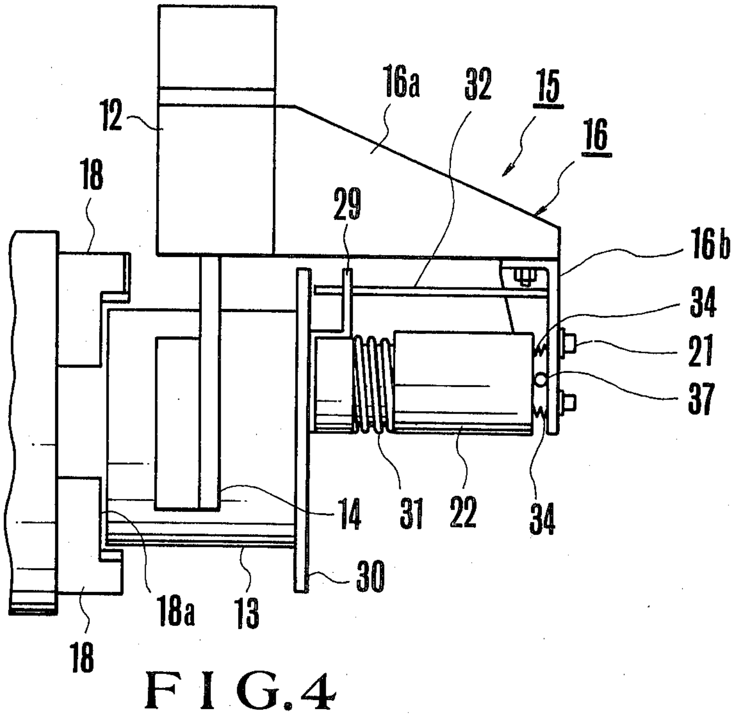
FIG. 3 is a side view showing a robot hand embodying the invention.
Figure 4:
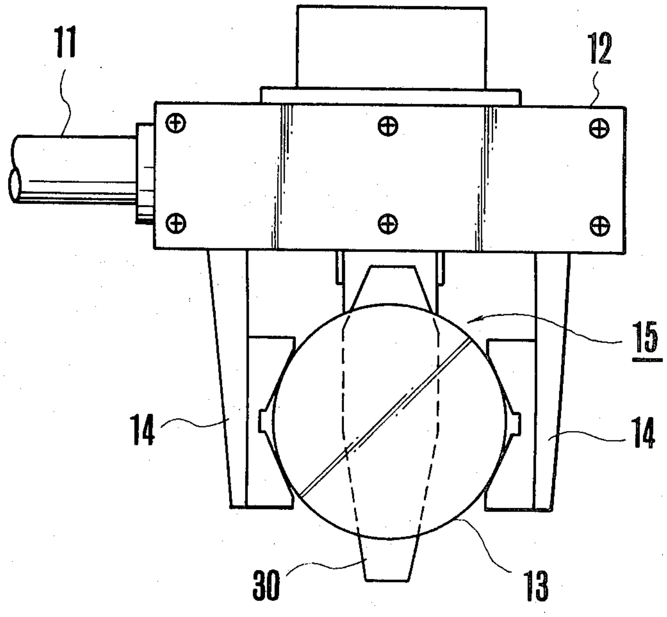
FIG. 4 is a front view showing the robot hand shown in FIG. 3.
Figure 5:
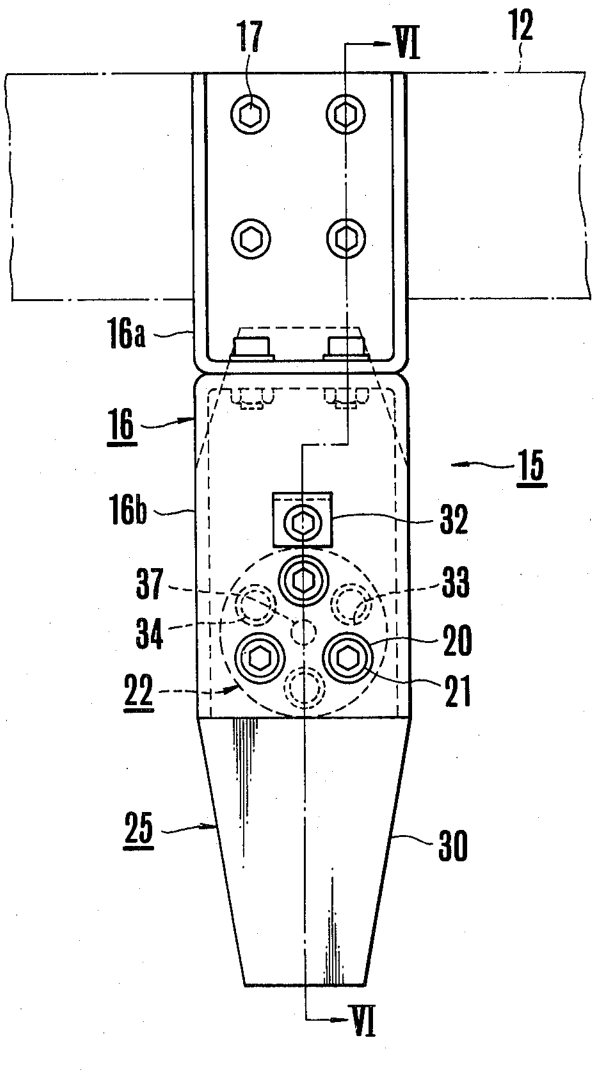
FIG. 5 is a rear view of the press device embodying the invention.
Figure 6:
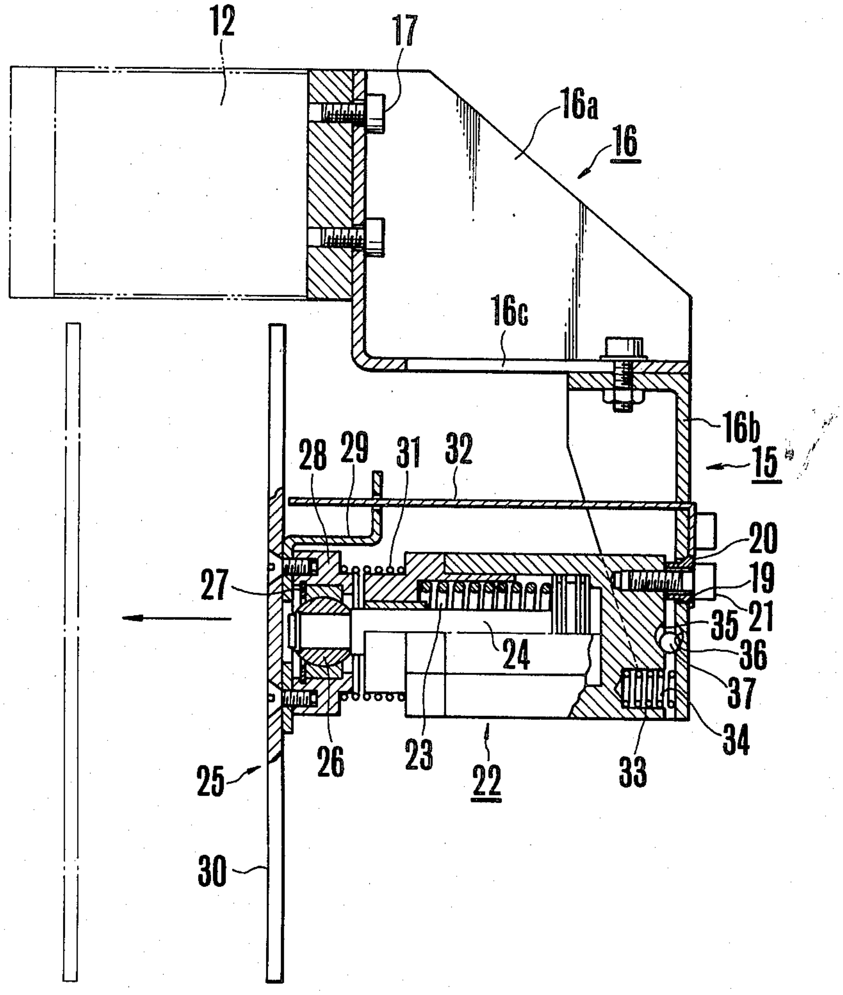
FIG. 6 is a sectional view taken along lines VI—VI of the press device shown in FIG. 5.

FIGS. 3 to 6 and FIGS. 7A to 7C show one embodiment or example of structure of a robot hand embodying the invention. As shown in FIGS. 3 and 4, a pair of fingers 14 adapted to clamp therebetween a cylindrical workpiece 13 extend downwardly from a robot hand 12 mounted on an arm 11 of a robot machine. A bracket 16 of a workpiece press device generally represented by a reference numeral 15 is secured to the rear surface of the robot hand 12 by bolts 17 (FIG. 5). The bracket 16 is constituted by an L-shaped main body 16*a* reinforced by triangular side plates, and a holding plate 16*b* adjustable with respect to the chuck surfaces 18*a* of a pair of upper and lower chuck jaws 18 and adjustably secured to the main body 16*a* through slots 16*c*. As shown in FIG. 6, three tapered openings 19 are formed on the lower portion of the holding plate 16*b* at the apices of a regular triangle (FIG. 5) for slidably receiving tapered bushings 20 each constituting a portion of a holding rod. The diameter of each tapered bushing increases as the distance from the chuck surface 18*a* increases and includes a tapered portion received in one of the tapered openings 19 and a straight portion contiguous to the tapered portion. The diameter of the straight portion is made to be smaller than that of a straight boring in the holding plate 16*b* so that when the tapered bushing is withdrawn to the outside, it is free to move in any direction. A bolt 21 extends through each tapered bushing 20, the bolt constituting a holding rod member together with the tapered bushing. Each bolt 21 is threaded into the rear surface of an air cylinder 22, to be described later, and serves to hold the air cylinder 22 via the tapered bushings 20.

The air cylinder 22 contains a piston rod 24 which is biased by a return spring 23 to move away from the chuck surface 18*a*. A work press member 25 is swingably mounted on the operating end (left end as viewed in FIG. 6) of the piston rod 24 by a spherical bearing 26. The work press member 25 includes a holder 28 fitted on the periphery of the spherical bearing 26 by a C-shaped ring 27 and a press plate 30 in the form of a boat secured to the holder 28 by screws via a plate 29, and a compression spring 31 interposed between the holder 28 and a shoulder of the air cylinder 22. Extending through an opening at the upper portion of the plate 29 is a flexible rotation preventing a plate 32 which is secured to the holding plate 16*b* and extend horizontally in the forward direction for preventing rotation of the press plate 30.

Three spring openings 33 are provided for the rear surface of the air cylinder 22 between adjacent bolts 21 on the apices of a triangle and are adapted for receiving compression springs 34 urging the air cylinder 22 to separate from the holding plate 16*b*. More particularly, the bolts 21 and the compression springs 34 are alternately arranged at an equal spacing on the same circle. Conical recesses 35 and 36, respectively, are formed on the rear surface of the air cylinder 22 and the inner surface of the holding plate 16*b* which oppose each other at the central portion of the circle.

Inserted between the recesses 35 and 36 is a steel ball 37 having a diameter slightly smaller than that of the recesses.

Figure 7A:
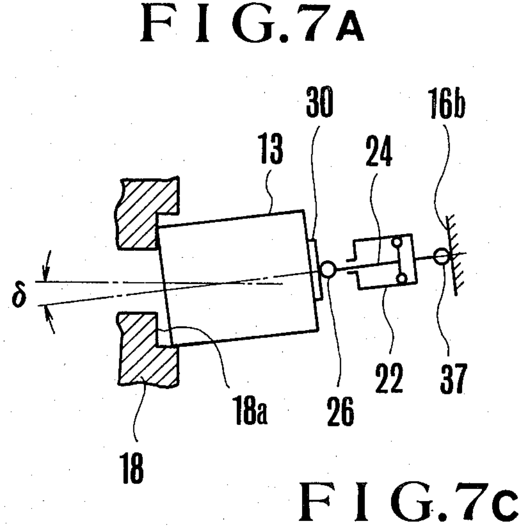
FIG. 7A through 7C are diagrams useful to explain the operation of the press device embodying the invention.
Figure 7B:
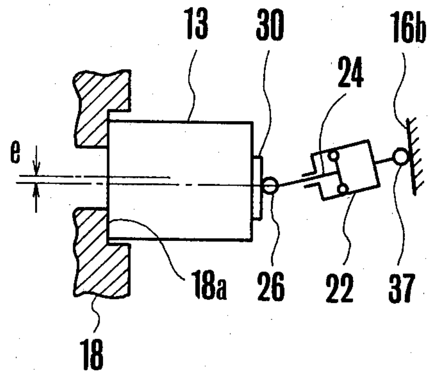
Figure 7C:
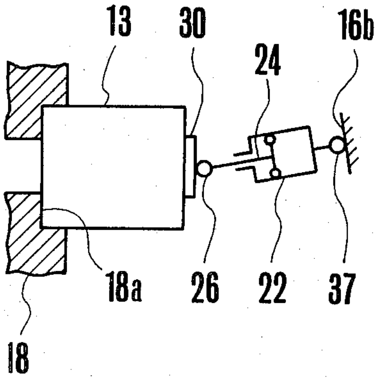

The operation of the robot hand, having a construction described above, will be described as follows with reference to FIGS. 3 to 6 and FIGS. 7A to 7C. After grasping a workpiece 13 with fingers 14, the robot hand 12 is moved together with the arm 11 to bring at least a portion of the fore end surface of the workpiece 13 into contact with the chuck surfaces 18*d* of the chuck 18, as shown in FIG. 7A. As the holding plate 16*b* holding the air cylinder 22 is adjustable in the slot 16*c* in the axial direction of the cylinder, the position of the holding plate 16*b* is preadjusted according to the length of the workpiece so as to move the press 30 to any position between solid lines and dot and dash lines shown in FIG. 6. When the workpiece 13 is urged against the chuck surfaces 18*a* as described above, the piston rod 24 of the air cylinder 22 is retracted by the return spring so that the axis of the work press member 25 is maintained in parallel with the axis of the piston rod 24 by the action of the compression spring 31. The air cylinder 22 is spaced from the inner surface of the holding plate 16*b* by three compression springs 34 so that the tapered portions of the bushings 20 are snugly fitted into the tapered portions of the holding plate 16*b*. Accordingly, the air cylinder 22 cannot swing while being held by bolts extending through the tapered bushings 20.

When air is admitted into the air cylinder 22 through an air inlet port, not shown, concurrently with the opening of the fingers, the piston rod 24 advances against the force of the return spring 23 to urge the press plate 30 against the workpiece 13 by slightly advancing the press plate 30. However, as the press plate 30 is held stationary, the air cylinder 22 is forced back to compress the compression springs 34 to decrease the gap between the air cylinder 22 and the holding plate 16*b*, thus disengaging the tapered bushings 20 from the tapered openings of the holding plate 16*b*. Furthermore, as shown in FIG. 6, the steel ball 37 which has been in the deepest portions of the recesses 35 and 36 is pushed to the centers of the recesses. The gaps between the tapered bushings 20, the bolts 21 and the tapered openings of the holding plate 16*b* permit the air cylinder 22 to swing about the steel ball 37. Accordingly, where there is a deflection angle $\delta$ between the workpiece 13 and the chuck 18*a*, as shown in FIG. 7A. The air cylinder 22 is swung about the steel ball 37 while the press member 25 is swung about the spherical bearing 26 with respect to the piston rod 24 to cause the air cylinder 22 to incline as if its both ends were held by universal couplings for eliminating the deflection angle $\delta$ between the workpiece 13 and the chuck 18 without resorting to slipage between the workpiece and the press plate 30. When the chuck 18 is closed under this condition, eccentricity e is also eliminated such that the workpiece 13 would be perfectly clamped by the chuck 18. The rotation of the press member 25 is prevented by the engagement of the plates 29 and 32 but as the rotation preventing plate 32 is made of a resilient material, the swinging motion of the press member 25 would not be prevented.

Although in the foregoing example of structure of the present invention, the invention was applied to a hand of a robot machine, it should be understood that the invention can be applied to any device which mounts a workpiece on a chuck. Further, in the foregoing example of structure the chucks are disposed in a vertical direction but it will be clear that they can be disposed in any direction.

As can be noted from the foregoing description, according to this invention, a work press member confronting a chuck surface is swingably supported by one end of a piston rod, the cylinder is supported by a plurality of tapered rods extending through a holding plate so that at the time of urging a workpiece by the press plate against a chuck, the tapered rods are disengaged from tapered openings of the holding plate so as to permit the cylinder to swing about a ball interposed between the cylinder and the holding plate. This eliminates the inclination of the workpiece by the swinging motion of the cylinder without resort to any slip between the press member and the workpiece, thereby perfectly preventing any deflection angle and eccentricity between the workpiece and the chuck regardless of the size of the workpiece, and thus holding the workpiece in an accurate position which insures precise chucking of the workpiece.

What is claimed as novel is as follows:

1. An apparatus for urging a workpiece against a chuck comprising:

- a stationary bracket including a holding plate facing said chuck and provided with tapered openings;
- a plurality of holding rods extending through said tapered openings, said holding rods being provided with tapered portions, the diameters thereof increasing with increasing distances from said chuck;
- a fluid pressure cylinder supported by said holding rods and having a piston rod;
- a workpiece press member pivotally mounted on an operating end of said piston rod;
- spring members interposed between said fluid pressure cylinder and said bracket for separating said fluid pressure cylinder away from said bracket; and
- a ball interposed between said holding plate and a rear end of said fluid pressure cylinder at the center of said plurality of holding rods for permitting swinging motion of said fluid pressure cylinder when the workpiece is urged by the press member.

2. The apparatus according to claim 1 wherein said workpiece press member is mounted on the operating end of said piston rod through a spherical bearing.

3. The apparatus according to claim 1 wherein said workpiece press member further comprises a press plate adapted to engage a workpiece to be grasped by said chuck and an L-shaped member with one leg formed with an opening, and wherein said bracket is provided with a bar extending toward said press plate through said opening for preventing rotation of said press plate.

4. The apparatus according to claim 1 further comprising opposed hemispherical recesses are formed on opposing surfaces of said fluid pressure cylinder and of said bracket at the center of said holding rods, said ball being received between said hemispherical recesses.

* * * * *

UNITED STATES PATENT AND TRADEMARK OFFICE

CERTIFICATE OF CORRECTION

PATENT NO. : 4,406,193

DATED : September 27, 1983

INVENTOR(S) : Sugino, et al.

It is certified that error appears in the above-identified patent and that said Letters Patent is hereby corrected as shown below:

Column 1, line 20, delete "is".

Column 1, line 41, after "plate" delete "in" and insert ---- is ----.

Column 3, line 10, delete "extend" and insert ---- extends ----.

Column 3, line 33, delete "18d" and insert ---- 18a ----.

Column 3, line 38, after "press" insert ---- plate ----.

Column 5, line 5, after "and" insert ---- further ----.

Column 6, line 4, delete "are".

Signed and Sealed this

*Third* Day of *April 1984*

[SEAL]

*Attest:*

GERALD J. MOSSINGHOFF

*Attesting Officer* *Commissioner of Patents and Trademarks*